(12) United States Patent
Kloft et al.

(10) Patent No.: US 10,145,390 B2
(45) Date of Patent: Dec. 4, 2018

(54) PRESSURE ACCUMULATOR

(71) Applicant: HYDAC TECHNOLOGY GMBH, Salzbach/Saar (DE)

(72) Inventors: Peter Kloft, Ransbach-Baumbach (DE); Herbert Baltes, Losheim (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 302 days.

(21) Appl. No.: 15/027,713

(22) PCT Filed: Nov. 14, 2014

(86) PCT No.: PCT/EP2014/003054
§ 371 (c)(1),
(2) Date: Apr. 7, 2016

(87) PCT Pub. No.: WO2015/104034
PCT Pub. Date: Jul. 16, 2015

(65) Prior Publication Data
US 2016/0245310 A1   Aug. 25, 2016

(30) Foreign Application Priority Data

Jan. 9, 2014   (DE) .................. 10 2014 000 358

(51) Int. Cl.
*F15B 1/10*   (2006.01)
*B32B 25/08*   (2006.01)
(Continued)

(52) U.S. Cl.
CPC ............... *F15B 1/10* (2013.01); *B32B 5/022* (2013.01); *B32B 5/024* (2013.01); *B32B 5/26* (2013.01);
(Continued)

(58) Field of Classification Search
CPC ....................................................... F15B 1/10
(Continued)

(56) References Cited

U.S. PATENT DOCUMENTS 2,422,529 A * 6/1947 Coffey .................. B29C 70/08
28/143
2,460,168 A   1/1949 Caserta
(Continued)

FOREIGN PATENT DOCUMENTS

DE   32 19 530   12/1983
DE   44 05 009   8/1995
(Continued)

OTHER PUBLICATIONS

Mokwena et al. (Mokwena, K, and Tang, J. "Ethylene Vinyl Alcohol: A Review of Barrier Properties for Packaging Shelf Stable Foods", Taylor and Francis Group, 2012. Retrieved from http://sites.bsyse.wsu.edu/tang/main/publications/pdfdocs/articles-published/tang215.pdf, on Mar. 24, 2018).*

(Continued)

*Primary Examiner* — Nathaniel E Wiehe
*Assistant Examiner* — Richard C Drake
(74) *Attorney, Agent, or Firm* — Wenderoth, Lind & Ponack, L.L.P.

(57) ABSTRACT

A pressure accumulator includes a membrane (4) forming a movable separating element between media spaces (6, 8) and made of contiguous layers (16, 18, 20, 22, 24, 26) of different materials. At least one layer of a basic structure (16, 20) has filaments. A gas-tight impregnation (24) is disposed between layers (18) made of an elastomer.

8 Claims, 2 Drawing Sheets

(51) Int. Cl.
*B32B 25/10* (2006.01)
*B32B 25/14* (2006.01)
*B32B 5/02* (2006.01)
*B32B 5/26* (2006.01)
*B32B 7/12* (2006.01)
*B32B 27/08* (2006.01)
*B32B 27/12* (2006.01)
*B32B 27/30* (2006.01)
*F16J 3/02* (2006.01)

(52) U.S. Cl.
CPC ............... *B32B 7/12* (2013.01); *B32B 25/08* (2013.01); *B32B 25/10* (2013.01); *B32B 25/14* (2013.01); *B32B 27/08* (2013.01); *B32B 27/12* (2013.01); *B32B 27/306* (2013.01); *F16J 3/02* (2013.01); *B32B 2260/021* (2013.01); *B32B 2260/046* (2013.01); *B32B 2262/0261* (2013.01); *F15B 2201/205* (2013.01); *F15B 2201/3155* (2013.01)

(58) Field of Classification Search
USPC ...................... 92/103 R; 428/475.5
See application file for complete search history.

(56) References Cited

U.S. PATENT DOCUMENTS

| | | | | |
|---|---|---|---|---|
| 2,564,602 A * | 8/1951 | Hurst | ............... | B29D 23/001 138/125 |
| 2,734,009 A * | 2/1956 | Coffey | ............... | F16J 3/02 156/550 |
| 2,899,982 A * | 8/1959 | Harpfer | ............... | B29C 70/085 138/126 |
| 2,920,655 A * | 1/1960 | Dwyer | ............... | F16J 3/02 92/100 |
| 3,397,621 A * | 8/1968 | Groves | ............... | F16H 59/30 92/103 R |
| 3,420,276 A * | 1/1969 | Skinner | ............... | B31C 3/00 138/127 |
| 4,091,843 A * | 5/1978 | Mikes | ............... | B29D 23/001 138/127 |
| 4,330,017 A * | 5/1982 | Satoh | ............... | F16L 11/086 138/126 |
| 4,676,853 A * | 6/1987 | Lerma | ............... | B29C 70/342 156/87 |
| 4,842,024 A * | 6/1989 | Palinchak | ............... | B60H 1/00571 138/109 |
| 4,862,923 A * | 9/1989 | Kitami | ............... | B60H 1/00571 138/125 |
| 4,992,314 A * | 2/1991 | Saitoh | ............... | C08J 5/10 138/123 |
| 5,036,110 A | 7/1991 | Moureaux | | |
| 5,445,191 A * | 8/1995 | Green | ............... | F16L 11/086 138/124 |
| 5,488,975 A * | 2/1996 | Chiles | ............... | F16L 11/085 138/124 |
| 5,524,671 A * | 6/1996 | Yoshida | ............... | B32B 25/08 138/30 |
| 5,618,629 A * | 4/1997 | Takamatsu | ............... | B32B 27/34 138/141 |
| 6,186,178 B1 | 2/2001 | Darroux | | |
| 6,189,435 B1* | 2/2001 | Vertanen | ............... | F01B 19/00 92/103 F |
| 6,615,876 B2 * | 9/2003 | Badders | ............... | B29C 47/0023 138/125 |
| 7,060,151 B2 * | 6/2006 | Badders | ............... | B29C 47/0023 156/244.11 |
| 7,905,172 B2 * | 3/2011 | Ohrle | ............... | F04B 43/0054 417/395 |
| 9,592,648 B2 * | 3/2017 | Harris | ............... | B32B 1/08 |
| 2003/0168463 A1* | 9/2003 | Yoshihara | ............... | B32B 1/08 220/723 |
| 2006/0260706 A1* | 11/2006 | Colbachini | ............... | B32B 25/10 138/123 |
| 2010/0151239 A1* | 6/2010 | Hebert | ............... | B32B 7/12 428/351 |

FOREIGN PATENT DOCUMENTS

| | | |
|---|---|---|
| DE | 102 26 410 | 1/2004 |
| DE | 10 2007 023 995 | 11/2008 |
| EP | 1 302 672 | 4/2003 |
| JP | 2005-282773 | 10/2005 |

OTHER PUBLICATIONS

New Zealand Institute of Chemistry ("Adhesives", e-publication retrieved from https://nzic.org.nz/ChemProcesses/polymers/10H.pdf, publication date of Sep. 28 2006 retrieved from http://web.archive.org).*

International Search Report (ISR) dated Apr. 20, 2015 in International (PCT) Application No. PCT/EP2014/003054.

* cited by examiner

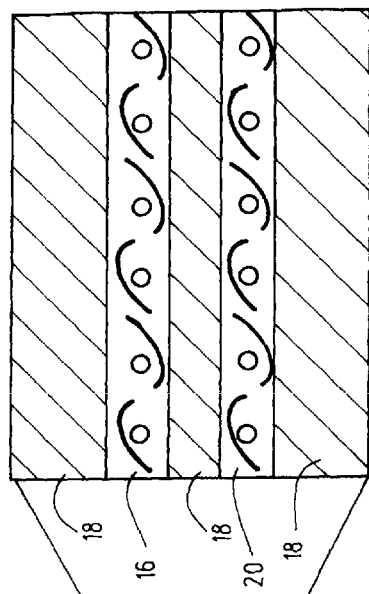
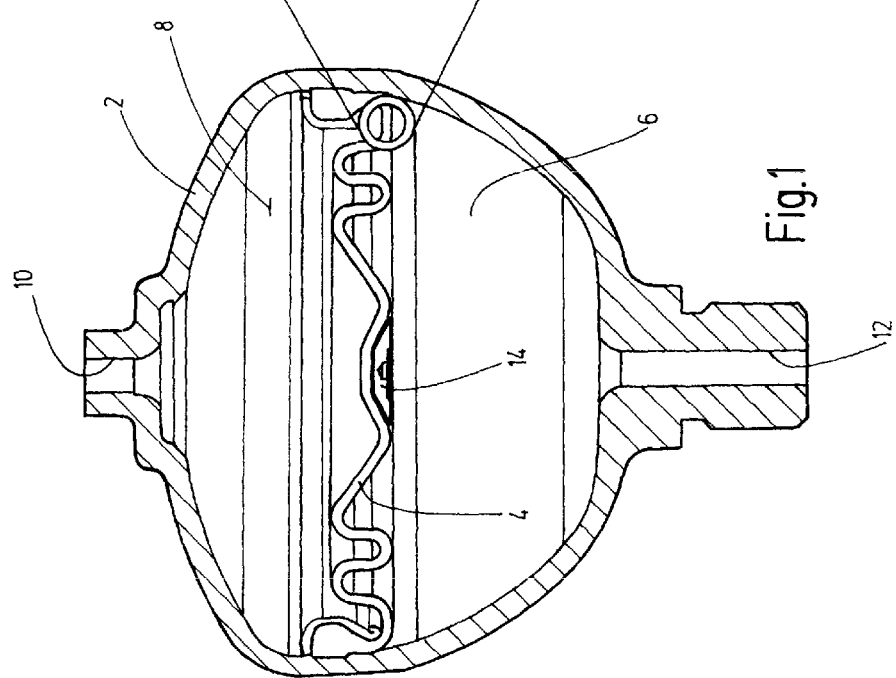

PRESSURE ACCUMULATOR

FIELD OF THE INVENTION

The invention relates to a pressure accumulator comprising a membrane that forms a moveable separating element between media spaces and that is made of contiguous layers of different materials.

BACKGROUND OF THE INVENTION

Pressure accumulators of this kind, which are called membrane accumulators, are prior art. Such pressure accumulators may be used in hydraulic systems as shock absorbers or pulsation dampers to dampen pressure shocks in a hydraulic circuit. Moreover, they may also be used as an energy source for a pump-less emergency circuit, and are also suitable, for example, as hydraulic compression springs and the like.

When using such pressure accumulators with a process gas, such as air or preferably nitrogen, the disadvantage is that the diaphragm becomes permeable to the enclosed gas depending on the chemical composition of the elastomer and its service life. The nitrogen or the air first dissolve in the elastomer and subsequently diffuse into the environment through evaporation. Thus, the amount of gas present in the storage system diminishes, and the operational reliability declines rapidly. This diminishing and decline renders the storage system unserviceable beyond reuse such that it must be discarded.

To increase the permeation resistance of an elastic, largely gastight synthetic membrane, the prior art is known to provide a multilayered composition of the membrane, where a layer from a cross-linked polysiloxane is applied through scraping on, spraying on, pouring on or brushing on (cf. DE 42 31 927 C2).

In another solution known from the prior art (see DE 44 05 009 A1), first and second synthetic membranes are provided to create a multilayered membrane unit, in which the first synthetic membrane is made of an elastomer, and the second synthetic membrane is a polyester film.

SUMMARY OF THE INVENTION

An object of the invention to provide a pressure accumulator, the membrane of which is characterized by a further improved permeation resistance that remains intact for long operating periods.

This object is basically met, according to the invention, by a pressure accumulator having a multilayered membrane unit provided with at least one layer of a base structure that comprises filaments and that has a gastight impregnation. The base structure is disposed between layers of an elastomer. When using a composition in a multilayered membrane unit that uses filaments as a constituent, the danger that layers, which have been applied to a substrate to increase gastightness, will lift off or flake off, is avoided. Due to the kneading action that the membrane is subjected to during operation, the prior art is prone to cracking in operation, which may lead to lifting off or flaking off. In contrast, with the gastight impregnation of a base structure that comprises filaments, according to the invention, a deep, permanent bond is created, while maintaining a high permeation resistance through the penetration of the impregnation and the surrounding of the filaments on the base structure.

The base structure may advantageously be formed from a synthetic textile, a knitted fabric or a non-woven. A synthetic textile made from polyamide (PA 6.6) is preferred.

In an advantageous embodiment the membrane may comprise, in succession, a layer of nitrile rubber (NBR), an impregnated base structure, a further layer of nitrile rubber (NBR), a second impregnated base structure, and a third layer of nitrile rubber (NBR). When providing two gastight impregnated base structures as part of the membrane unit, a particularly high permeation coefficient can be achieved.

Providing the impregnation to both sides of the respective base structure by applying a layer of polyvinyl acetate (PVAc) can be of particular advantage.

Moreover, a barrier layer of ethylene vinyl alcohol copolymer (EVOH) may be provided with particular advantage between the respective impregnated base structure and a layer of nitrile rubber (NBR).

In a particularly advantageous exemplary embodiment, the membrane comprises, in succession, a barrier layer of nitrile rubber (NBR) with an adhesive coating, a layer of ethylene vinyl alcohol copolymer (EVOH), an impregnated layer of polyvinyl acetate (PVAc), a base structure, an impregnated layer of polyvinyl acetate (PVAc), a barrier layer of ethylene vinyl alcohol copolymer (EVOH), an adhesive coating, a barrier layer of ethylene vinyl alcohol copolymer (EVOH), an impregnated layer of polyvinyl acetate (PVAc), a second base structure, an impregnated layer of polyvinyl acetate (PVAc), a barrier layer of ethylene vinyl alcohol copolymer (EVOH) as well as an adhesive coating on a layer of nitrile rubber (NBR).

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 1 is a schematic side view in section of a pressure accumulator according to an exemplary embodiment of the invention;

FIG. 1a is a highly enlarged, schematic (not to scale) side view in section of a portion of the membrane of the exemplary embodiment of FIG. 1.

DETAILED DESCRIPTION OF THE INVENTION

Figure 2:
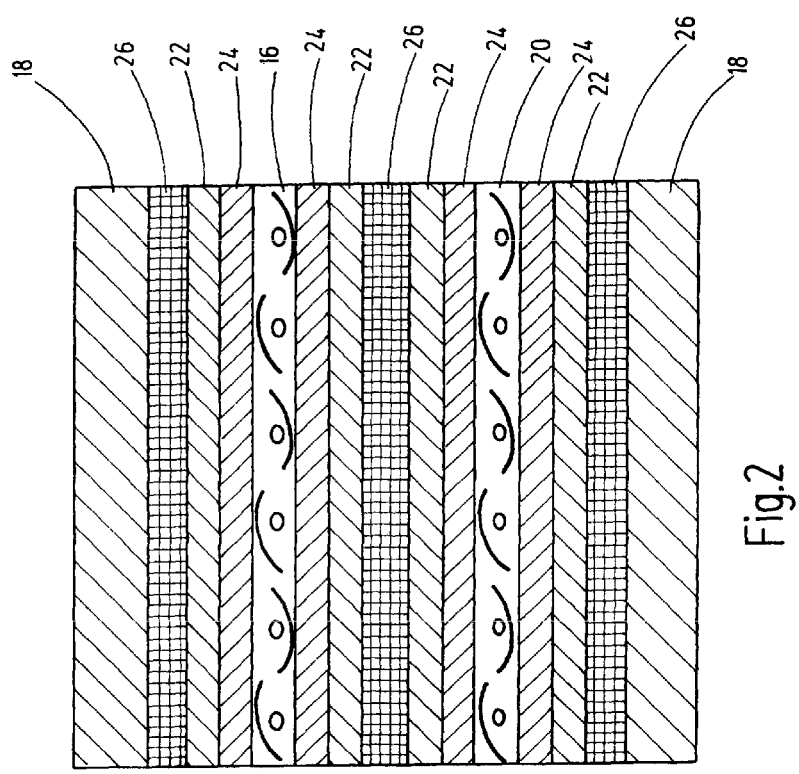
FIG. 2 is a highly enlarged schematic (not to scale) side view in section of a portion of a membrane according to a modified exemplary embodiment of the invention.

FIG. 1 depicts a pressure accumulator according to the invention with an accumulator housing 2 featuring a welded design. In the accumulator, a multilayered membrane 4 acts as a moveable separator and separates a fluid side 6 from a gas side 8. The gas side 8 may be filled with a process gas, such as nitrogen, via a fill socket 10. The fluid side 6 is provided with a fluid connector 12, serving as a connection to a hydraulic system (not shown). In the central region of the membrane 4, on the side that faces the fluid connector 12, a valve disk 14 is disposed. Valve disk 14 closes the fluid connector 12 when the fluid side 6 is fully drained and the membrane 4 is extended correspondingly. FIG. 1 depicts the membrane 4 in a position assumed when the accumulator is fully drained and depressurized.

FIG. 1a provides a schematic representation of the layer structure of an exemplary embodiment of membrane 4. In the depicted example, a gastight impregnated base structure 16 with filaments is disposed between two layers 18 of an elastomer, such as NBR. A coating of polyvinyl acetate has been applied to both sides of the base structure 16 to provide a gastight impregnation. This priming coat is not depicted in FIG. 1a. The base structure 16 itself is made from a polyamide PA 6.6 synthetic fabric. The membrane 4 of the example shown in FIG. 1a features a second gastight impregnated base structure 20 that, like the first base structure 16, is disposed between layers 18 of elastomer. Analogous to the base structure 16, the second base structure 20 is also made from a polyvinyl acetate PA 6.6 synthetic fabric, with an impregnating priming coat of polyvinyl acetate also applied to both sides. The practical implementation of the membrane 4, which is formed of the layers stated above, has an overall thickness of 0.6 mm.

In the exemplary embodiment depicted in FIG. 2, the membrane 4 is provided, in addition to the layers provided in the first example, on every side of the impregnating priming coat 24 of the first and second base structure 16 and 20, each base structure being provided with a barrier layer 22 made of ethylene vinyl alcohol copolymer (EVOH). Each barrier layer 22 is contiguous to the impregnating priming coat 24 on both sides of each of the first and second base structures 16, 20, as shown in FIG. 2. An adhesive coating 26 is disposed between the two outer layers of the elastomer 18 and the subsequent barrier layer 22, as well as between the adjacent barrier layers 22 of the first and second base structures 16, 20.

Analogous to the first described example, the membrane 4 may also be produced to have an overall thickness of 0.6 mm despite the greater number of layers as per the example of FIG. 2. For example, the thickness of the outer layers of elastomer 18 and adhesive coating 26 may each be 0.15 mm. The thicknesses of the first and second base structures 16, 20 including priming coats 24 and barrier layers 22 may each be 0.13 mm. The central adhesive coating 26 may have a layer thickness of 0.04 mm. As a result of two pairs of additional barrier layers 22 of ethylene vinyl alcohol copolymer EVOH, which are disposed on both sides of and adjacent to the first and second base structures 16, 20, the highest level of gastightness of the membrane 4 can be achieved.

The gastight impregnation 24 is applied in-situ into the base structure. The otherwise commonly applied adhesive and connecting layers, particularly in form of adhesive coatings, can be omitted completely in this section. Moreover, the impregnation applied to the base structure also stiffens the fabric layer, and thus, reinforces it.

While various embodiments have been chosen to illustrate the invention, it will be understood by those skilled in the art that various changes and modifications can be made therein without departing from the scope of the invention as defined in the claims.

The invention claimed is:

1. A pressure accumulator, comprising:
a housing having first and second media spaces; and
a movable separating element in said housing located between and separating said first and second media spaces, said separating element having contiguous layers of different materials, said layers including a first layer of a base structure having filaments and a gastight impregnation coating, said first layer being disposed between second and third layers of an elastomer, said separating element including a fourth layer of a filament-containing, impregnated structure and a fifth layer of an elastomer between said first layer and said fourth layer.

2. A pressure accumulator according to claim 1 wherein said filaments of said base structure are at least one of a textile, a knitted fabric or a non-woven fabric.

3. A pressure accumulator according to claim 1 wherein said first layer comprises a synthetic fabric.

4. A pressure accumulator according to claim 3 wherein said synthetic fabric is made of polyamide.

5. A pressure accumulator according to claim 1 wherein said separating element comprises a membrane having in succession said second layer, said first layer, said third layer, said fourth layer and said fifth layer, said second layer, said third layer and said fifth layer being made of nitrile rubber.

6. A pressure accumulator according to claim 1 wherein said gastight impregnated coating is provided on both sides of said first layer between said first layer and said second and third layers and comprises polyvinyl acetate.

7. A pressure accumulator according to claim 1 wherein said separating element comprises a barrier layer of ethylene vinyl alcohol copolymer between said first layer and at least one of said second layer or said third layer.

8. A pressure accumulator, comprising:
a housing having first and second media spaces; and
a movable separating membrane including in succession a layer of nitrile rubber, an adhesive coating, a barrier layer of ethylene vinyl alcohol copolymer, an impregnated layer of polyvinyl acetate, a base structure having filaments, an impregnated layer of polyvinyl acetate, a barrier layer of ethylene vinyl alcohol copolymer, an adhesive coating, a barrier layer of ethylene vinyl alcohol copolymer, an impregnated layer of polyvinyl acetate, a base structure having filaments, an impregnated layer of polyvinyl acetate, a barrier layer of ethylene vinyl alcohol copolymer, an adhesive coating and a layer of nitrile rubber.

* * * * *